Patented Jan. 6, 1953

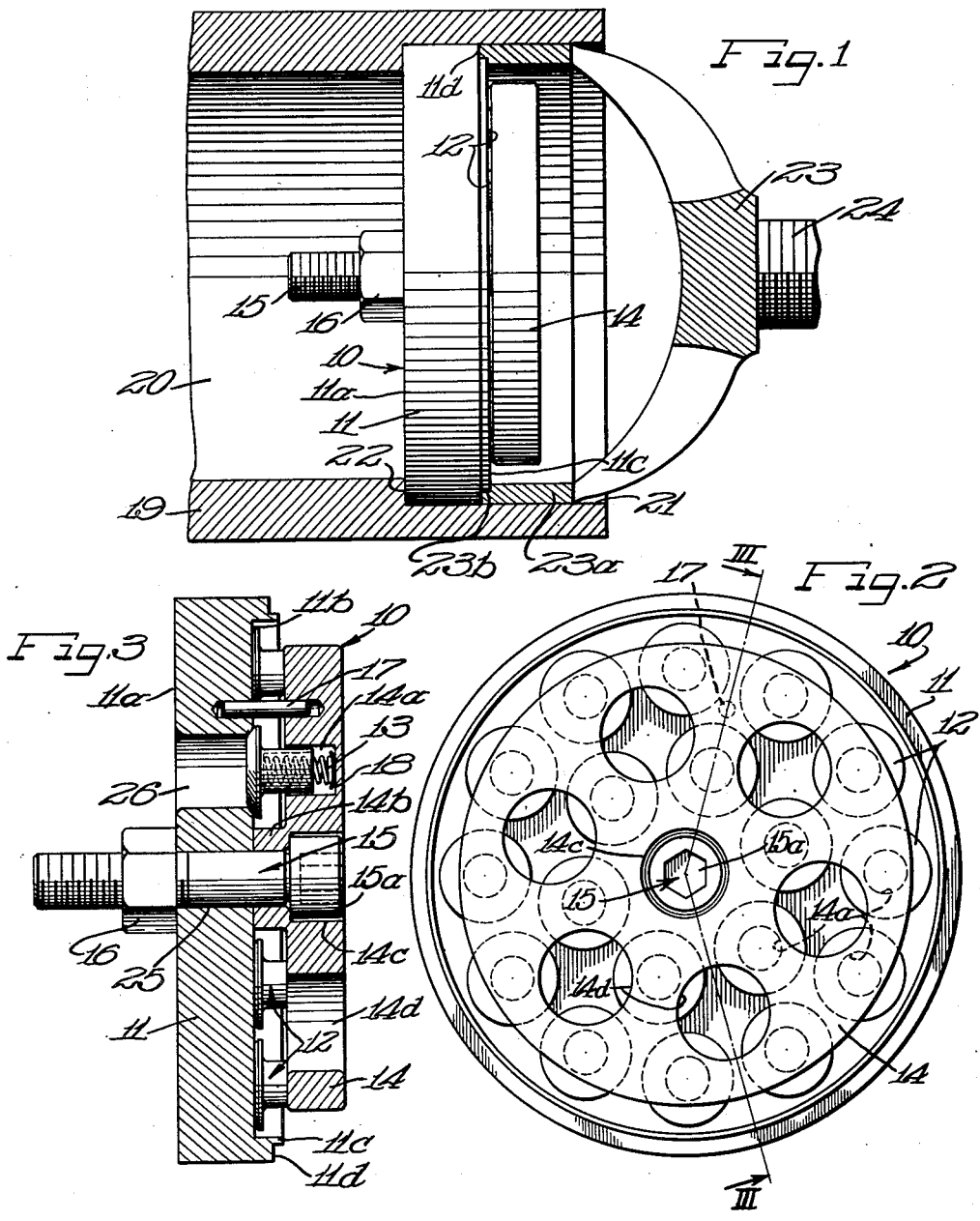

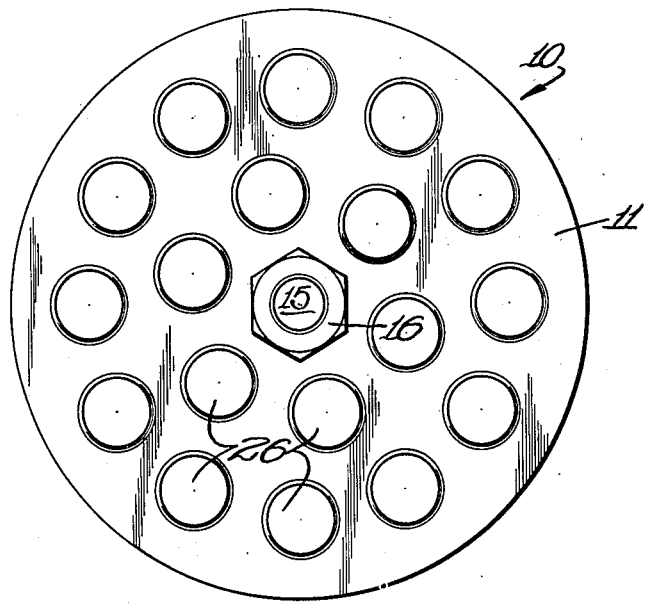
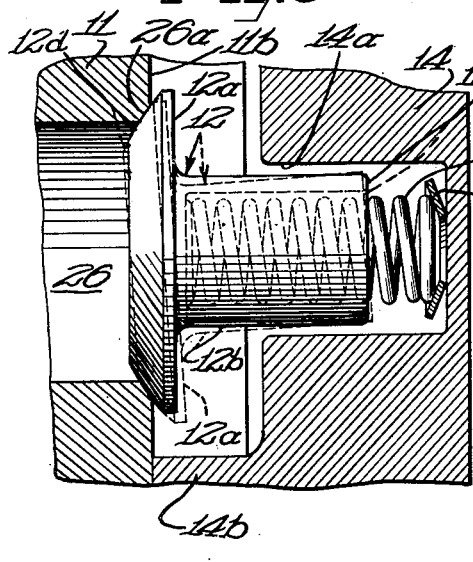
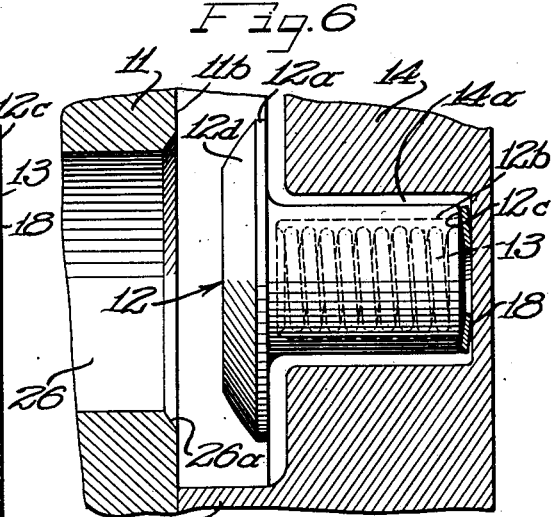
Inventors
Edwin D. Watson
James D. Creek

2,624,587

UNITED STATES PATENT OFFICE 2,624,587

VALVE ASSEMBLY

Edwin D. Watson, South Gate, and James D. Creek, Lynwood, Calif., assignors to Thompson Products, Inc., Cleveland, Ohio, a corporation of Ohio Application August 30, 1949, Serial No. 113,066

3 Claims. (Cl. 277—60)

This invention relates to a valve assembly suitable for compressors and the like which has an enhanced flow capacity for its size.

Specifically, the invention deals with a compressor valve assembly having unimpeded flow passages controlled by valves with hollow stems guided in a retainer that loads a spring for each valve and is held in position by a single draw bolt.

While this invention will hereinafter be specifically described as embodied in an assembly of valves for use with a compressor, it should be understood that the invention is not limited to any particular usage, since the structures of this invention are generally useful in controlling flow of fluid under pressure.

According to this invention a body member in the form of a thick metal disk or block has a plurality of circular holes formed therethrough. One face of the disk is provided with a spherically concave bevel around each hole. A valve having a head with a convex spherical seating face is provided for mating with each seating face on the disk. Each valve has a tubular stem projecting away from the disk into a recess in a retainer block, which provides a free-fitting guide for the valve. A spring is seated in the valve stem and is compressed between the valve head and the block. If desired, a second spring, preferably in the form of a dished washer, is provided at the blind end of the recess to absorb shock impacts from the end of the valve stem. A single draw bolt connects the retainer and disk and is effective to uniformly load all of the springs. The retainer block is spaced from the disk by means of a boss portion surrounding the draw bolt. To facilitate unrestricted flow from the holes in the disk past the retainer, the retainer is provided with a plurality of through holes intermediate the recesses for the valve stems.

A feature of the invention resides in the use of spherical mating faces on the valves and valve seats to accommodate misalignment of the valves in their stem guides without interfering with sealing efficiency of the assembly.

Another feature of the invention resides in the provision of unimpeded flow holes in the body of the assembly.

It is, then, an important object of the invention to provide a valve assembly suitable for compressors and the like which will have a large flow capacity in a restricted area and which will be capable of sealing under very high pressures.

Another object of the invention is to provide an assembly of valves each controlling a single flow passage and each capable of high speed operation with a minimum amount of inertia.

Another feature of the invention is to provide a valve assembly with a plurality of relief valves that will effectively operate through a relatively short stroke and which will cooperate to provide a high flow capacity for passage of gaseous fluids.

A specific object of the invention is to provide a compressor valve assembly with hollow stemmed valves receiving closure springs in the hollow stems thereof.

Other and further objects and features of this invention will be apparent to those skilled in the art from the following detailed description of the annexed sheets of drawings which, by way of a preferred example only, illustrate one embodiment of this invention.

On the drawings:

Figure 1 is a side elevational view of a valve assembly according to this invention mounted in a compressor discharge passage shown in vertical cross section.

Figure 2 is a top plan view of the valve assembly included in Figure 1.

Figure 3 is a transverse cross-sectional view taken substantially along the line III—III of Figure 2.

Figure 4 is a bottom plan view of the valve assembly shown in Figures 1 to 3.

Figure 5 is a fragmentary enlarged vertical cross-sectional view, with parts in elevation, illustrating one of the valves in the assembly and the manner in which sealing efficiency is maintained even when the valve is in cocked position.

Figure 6 is a view similar to Figure 5 but showing the valve in a fully opened position.

As shown on the drawings:

The valve assembly 10 shown in Figures 1 to 4 is composed of a relatively thick metal disk or circular block 11, a plurality of valves 12, a spring 13 for each valve 12, a retainer head 14 for slidably guiding the valves 12 and for bottoming the springs 13, a draw bolt 15 for connecting the retainer 14 and disk 11, a nut 16 on the bolt 15, a pin 17 for preventing relative rotation of the retainer and disk, and a Belleville type washer 18 for each spring 13.

As shown in Figure 1, a housing 19 defining a discharge passageway 20 from a compressor (not shown) has a counterbore 21 in the end thereof terminating inwardly from the end at a shoulder 22. The disk 11, forming the body of the assembly 10, fits this counterbore 21 and has a flat face 11a bottomed on the shoulder 22, around the peripheral margin thereof. The opposite face of the disk 11 has a recess 11b bounded by a circular flange 11c extending above a flat shoulder 11d at a level above the bottom of the recess 11b as best shown in Figure 3.

As shown in Figure 1, a hold-down bracket 23 is acted on by a screw 24 for clamping the assembly 10 in the housing 19 against the shoulder 22. This bracket 23 has an annular rim 23a with a leading end 23b that is stepped to fit against the shoulder 11d and over the rim 11c of the disk 11. The rim 23a fits in the bore 21 and has an inner diameter substantially flush with the side wall of the recess 11b of the disk 11 so as not to overhang the recess.

The disk 11 is provided with a bore 25 in the axial center thereof for receiving the shank of the bolt 15. A plurality of cylindrical bores 26 surround this central bore 25 and, as shown in Figure 4, are preferably in two concentric rings centered by the bolt 15. As shown in Figure 4, the outer ring has twelve bores 26 while the inner ring has six bores 26. Each bore is cylindrical and is unimpeded from the bottom face 11a to the recessed face 11b of the disk 11.

As best shown in Figures 5 and 6, the bottom recessed face 11b of the disk 11 has a beveled mouth 26a surrounding each bore 26. This mouth 26a is in the shape of a concave fragmental sphere to provide a valve seat.

Each valve 12 is composed of an enlarged head 12a and a smaller diameter tubular stem 12b projecting outwardly from the head 12a into an individual well or cylindrical recess 14a in the retainer 14. The stem 12b fits rather loosely in the recess 14a. The coil spring 13 extends freely into the tubular stem 12b and is bottomed on the head 12a of the valve. The Belleville washer spring 18 is interposed between the spring 13 and the bottom of the well or recess 14a of the retainer 14. As shown, the spring 13 fits freely in the tubular stem 12b and projects into the concave side of the Belleville washer 18. This washer 18, however, is of larger diameter than the bore in the stem 12b so that, when the valve is opened, the rim end 12c of the stem will thrust against the washer, causing it to flatten as shown in Figure 6. The washer thereupon acts as a shock absorber to cushion the blow of the valve on the retainer 14. It should be understood, however, that the washer 18 is not necessary, and that the spring 13 could be bottomed directly on the retainer 14.

The head 12a of the valve has an annular seating face 12d of convex fragmental spherical contour to mate with the seat 26a. As shown, the seating face 12d of the valve converges from a diameter which is larger than the greatest diameter of the seat 26a to a diameter which is smaller than the bore 26, so that when the valve stem 12b is coaxial with the bore 26, the face 12d will engage the seat 26a intermediate the small and large diameters of the face as shown in solid lines in Figure 5.

Since the stem 12b fits loosely in the well 14a to insure free floating action of the valve, it may be possible for the stem to occasionally tilt out of coaxial alignment with the bore 26 to tilt the valve as shown in dotted lines in Figure 5. Nevertheless, the mating spherical face 12d of the valve and seat 26a of the bore 26 will insure full sealing contact between the valve and disk to close the bore 26. This feature renders it unnecessary to accurately guide the stem 12b in the well 14a.

As shown in Figures 3, 5, and 6, the retainer 14 has a depending central boss portion 14b receiving the bolt shank therethrough and bottomed on the recessed face 11b of the disk 11. A countersunk portion 14c is provided in the outer face of the retainer in coaxial alignment with the bore in the boss 14b and this recess is adapted to freely receive the socket head 15a of the bolt 15. The use of a socket head bolt makes possible the elimination of a bolt head projection beyond the retainer 14.

As shown in Figures 2 and 3, the retainer 14 has a ring of holes 14d therethrough arranged between the rings of wells 14a which receive the valve stems so that the holes 14d do not communicate with a well. As indicated in Figure 2, six holes 14d are provided in a ring that is concentric with the center of the retainer. These holes 14d accommodate passage of air or other fluid freely through the retainer. Since the retainer is of smaller diameter than the recessed face 11b of the disk 11, fluid can also flow freely around the periphery of the retainer.

The pin 17 is seated in blind bores provided in the retainer and disk and is effective to prevent relative rotation of the disk and retainer.

The boss 14b of the retainer 14, when bottomed against the recessed face 11b of the disk 11 by the bolt 15, will hold the inner face of the disk at a level just beyond the rim flange 11c of the disk and, since the mating face of the boss and the bottom of the recessed face of the disk are flat the bottoms of the wells 14a of the retainer will each be equally spaced from the valve seat with which they are aligned, so as to uniformly load the springs 13 and 18.

As shown in Figure 6, when a valve 12 is fully opened, the head 12a thereof will still be spaced from the inner face of the retainer so that all of the impact load will be borne by the bottom of the well as cushioned by the spring 18.

The assembly 10 of this invention thus operates to accommodate flow of air or gas from the passage 20 through the unimpeded bores 26 which are controlled by the valves 12. These valves are relatively small, light in weight, and freely operative so that they will open and close without substantial inertia. When the valves are open, the air will pass freely through the bores 26 into the recess face 11b of the disk 11 to then disperse freely around the periphery of the retainer 14 and through the holes 14d in the retainer. As soon as the pressure on the upstream side of the passage 20 drops below the pressure for which the valve spring has been set to close, the valves will quickly close to seal their individual passages 26.

From the above descriptions it should therefore be understood that this invention provides an assembly of valves especially suitable for compressors and the like wherein a multi-apertured body has each of the apertures controlled by an individual spring-loaded valve operating without substantial inertia in a relatively short stroke and guided by a single retainer unit which is held in operative relation by a single draw bolt that simultaneously and equally loads each valve spring.

It will be understood that modifications and variations may be effected without departing from the scope of the novel concepts of the present invention.

We claim as our invention:

1. A valve assembly of enhanced flow capacity which comprises a block having a plurality of unimpeded holes therethrough, one face of said block having a beveled mouth around each hole defining a valve seat for each hole, said valve seat having a concave fragmental spherical contour, a valve for each seat having a head with an annular seating face of convex fragmental spherical contour and a hollow tubular stem projecting from the head, a retainer having blind wells therein loosely guiding the valve stems, a coil spring in each valve stem, a Belleville washer spring bottomed in each well and receiving the end of the coil spring projecting from the valve stem, each Belleville washer having a diameter larger than the coil spring so as to be engaged by the end of the valve stem when the valve is opened, and a central draw bolt assembly uniting the block and retainer for simultaneously loading all of the valve springs whereupon said valves will be urged into sealing engagement with the valve seats and said valve seats will accommodate misalignment of the valve without permitting leakage.

2. A valve assembly suitable for compressor housings and the like which comprises a relatively thick metal disk having a plurality of circular bores therethrough arranged in spaced concentric relation about the center of the disk, a plurality of valves, one for each bore in the disk having a head movable toward and away from an end of the bore controlled thereby, each of said valves having a tubular stem projecting away from said disk, a retainer secured in spaced relation to said disk and having blind wells spaced and dimensioned for loosely receiving each stem, and a spring washer resiliently connected with each of said valves and interposed between the retainer and the rim end of the respective tubular stem to absorb thrusts of such valve against the retainer.

3. In a valve assembly, the improvement which comprises a valve retainer plate having a blind well recessed in one face, a valve having a closed valve head and a hollow tubular stem projecting from said head into said well, said tubular stem being dimensioned to fit loosely within said well, a coil spring fitted within said tubular stem bottomed against said head and normally extending outwardly from said tubular stem, and a washer spring engaged by the outward end of said coil spring and centered between said coil spring and the bottom of said well, said washer spring having a diameter to underlie the rim end of said tubular stem to resiliently engage the said rim end when said coil spring is compressed within said tubular stem.

EDWIN D. WATSON.
JAMES D. CREEK.

REFERENCES CITED

The following references are of record in the file of this patent:

UNITED STATES PATENTS

| Number | Name | Date |
|---|---|---|
| 1,376,484 | Tuttle | May 3, 1921 |
| 1,502,734 | Martin | July 29, 1924 |
| 1,551,697 | Richardson | Sept. 1, 1925 |
| 1,651,235 | Terrill | Nov. 29, 1927 |
| 2,000,691 | Collins | May 7, 1935 |
| 2,041,970 | Shepherd | May 26, 1936 |
| 2,118,435 | Jados | May 24, 1938 |
| 2,192,193 | Johnson | Mar. 5, 1940 |
| 2,471,294 | Watts | May 24, 1949 |

FOREIGN PATENTS

| Number | Country | Date |
|---|---|---|
| 14,722 | France | of 1911 |
| 28,864 | Great Britain | Dec. 12, 1910 |
| 73,838 | Austria | Sept. 25, 1917 |